May 16, 1967

W. W. WOLFORD 3,319,498

PLASTIC BOTTLE TRIMMING METHOD

Filed Oct. 8, 1965

INVENTOR.
WALLACE W. WOLFORD
BY
J. R. Nelson and
W. A. Schaich
ATTORNEYS

INVENTOR.
WALLACE W. WOLFORD

May 16, 1967  W. W. WOLFORD  3,319,498
PLASTIC BOTTLE TRIMMING METHOD
Filed Oct. 8, 1965  7 Sheets-Sheet 3

INVENTOR.
WALLACE W. WOLFORD
BY J. R. Nelson and
W. A. Schuch
ATTORNEYS

May 16, 1967  W. W. WOLFORD  3,319,498
PLASTIC BOTTLE TRIMMING METHOD
Filed Oct. 8, 1965  7 Sheets-Sheet 5

INVENTOR.
WALLACE W. WOLFORD
BY J. R. Nelson and
W. A. Schaich
ATTORNEYS

United States Patent Office 3,319,498
Patented May 16, 1967

3,319,498
PLASTIC BOTTLE TRIMMING METHOD
Wallace W. Wolford, Toledo, Ohio, assignor to Owens-Illinois, Inc., a corporation of Ohio
Original application Aug. 13, 1963, Ser. No. 301,757. Divided and this application Oct. 8, 1965, Ser. No. 494,115
9 Claims. (Cl. 83—35)

This application is a division of my co-pending application Ser. No. 301,757, filed Aug. 13, 1963.

This invention relates to methods for removing flash from molded articles, such as plastic bottles.

For convenience, certain terms employed in the specification are defined as follows.

The term "flash" refers to a fin-like web which projects from the surface of the article. Flash is formed in the molding operation by material which is caught between the closing mold halves or forced between the mold half faces during the molding operation.

The term "general plane of the flash" refers to that general plane in which the flash lies. In the usual case this general plane is a central vertical plane containing the vertical center line of the article. It will contain the parting lines of the mold halves.

The term "line of juncture" refers to the line along which the flash is joined to the article surface—i.e. the line of intersection of the general plane of the flash with the article surface.

Because of the fact that the flash has a finite thickness, the terms "general plane" and "line of juncture" are used in a generalized sense, rather than a strict geometrical manner.

While the invention will be described specifically in terms of removing the flash from a molded plastic bottle having an integrally molded handle, it will become apparent from the description that the invention is applicable to other types of molded articles. The molded plastic bottle having a handle has been chosen as a specific example since this particular article presents a wide variety of problems of flash removal.

In the molding of plastic bottles of the foregoing type, the neck or finish of the bottle is first injection molded and a tubular parison is formed, or the tubular parison is formed and the neck or finish is blown in the molds. The parison is then positioned in operative alignment with a pair of blow mold halves which are then closed upon the parison. The interior of the tubular parison is then pressurized to expand the parison into contact with the mold walls. In the formation of handled bottles, the tubular parison is initially expanded prior to the closing of the mold to make sure that the handle portion of the mold will close upon a portion of the parison. This inherently requires that the closing mold halves grip between them some of the plastic material of the parison, thereby resulting in a web of plastic material within the handle opening at the conclusion of the molding process. Additionally, as the mold closes, a certain amount of the parison is caught between the closing mold faces in the region of the shoulder, thus resulting in projecting fins on the shoulder of the completed article. The projecting fins and the web within the handle opening are referred to below generally as "flash."

While attempts have been made to provide apparatus for automatically removing the flash formed on the molded bottle in the manner described above, many problems have been encountered. Experience has shown that in molded plastic articles of this type, the articles produced by the molding operation described generally above are not precisely uniform and variations will be encountered even in articles produced from the same mold. These variations, unfortunately, are most prevalent in the region where the flash is formed and thus most prior machines designed to automatically remove the flash from the article have not been found to be economically feasible due to high reject rates caused primarily by difficulties in accurately aligning the article with the flash severing apparatus.

In the case where reciprocating knives and dies are employed to sever the flash from the article along the line of juncture of the flash with the article, lack of precision of the initial alignment of the article with the reciprocating die knife assembly results in the knife cutting either too deeply into the flash, thereby leaving a projecting rib on the article, or cutting too deeply into the article surface, resulting in a weakened spot or even cutting entirely through the relatively thin-walled bottle.

Because of these difficulties, it has been conventional practice in the industry to manually sever the flash from the articles. In view of the fact that bottles of the type under consideration are produced in substantial quantities, (a bottle similar to that under consideration being presently employed to market a leading brand of bleach on a nationwide basis) manual removal of the flash from the bottle is obviously impractical.

Accordingly, it is an object of the present invention to provide a method for removing flash from molded articles wherein accurate severing of the flash from the articles is achieved even in the presence of normally encountered variations in the article configuration.

It is another object of the invention to provide method for removing flash from molded articles by means of a die-knife combination wherein the article is accurately aligned and registered with the severing apparatus by using the surface to be cut as the surface which orients the article relative to the severing apparatus.

Still another object of the invention is to provide method for severing the flash from molded articles wherein the flash may be joined to the article along lines of juncture which are non-symmetrical, separated, and/or of variable contour.

The foregoing, and other objects are achieved by moving the article into seated engagement with its die in a fashion such that the final position of the article with respect to the die is determined by the engagement of the line of juncture on the article or the surface of the article or flash closely adjacent the line of juncture, with the corresponding surfaces of the die.

In the case under consideration where there are two separated lines of juncture (one on each side of the bottle neck) the article is seated first in one of the two dies and the corresponding knife is actuated to sever the flash from that side of the article. The first die and knife are then retracted clear of the article and the article is then seated in the second die, the final position of the article relative to the second being again determined by engagement of the article with the die at or closely adjacent to the line of juncture. The second knife is then actuated to sever the flash from the second side of the article.

By employing the surface to be cut as the orienting surface to locate the article relative to the die, minor variations of configuration and relative location of surfaces on the article are of no consequence, since the surface to be cut is employed to position itself in the proper position in the die and knife assembly.

Other objects and features of the invention will become apparent by reference to the following specification and to the drawings.

While the present application is directed specifically to the method aspects of the invention, it is believed that the method can be most clearly explained by reference to one form of apparatus for performing the method. The apparatus disclosed in the drawings is illustrated and described in much greater detail in parent application Ser. No. 301,757, filed Aug. 13, 1963, to which reference may be had for further mechanical details. The present application includes reference only to those mechanical features of primary interest in connection with the performance of the method. The reference numerals employed in this application are the same as those employed in the parent application Ser. No. 301,757.

In the drawings, one form of apparatus for performing the present method is disclosed as including a stationary fixed frame which includes four vertical posts 32 mounted in fixed positions and between which extends the horizontal upper run 38 of an endless belt conveyor driven, by suitable means not shown, to move in the direction indicated by the arrows in the drawings. A horizontal sub-frame designated generally 40 is cooperatively supported by posts 32 to be vertically adjusted upon the posts.

Figure 3A:
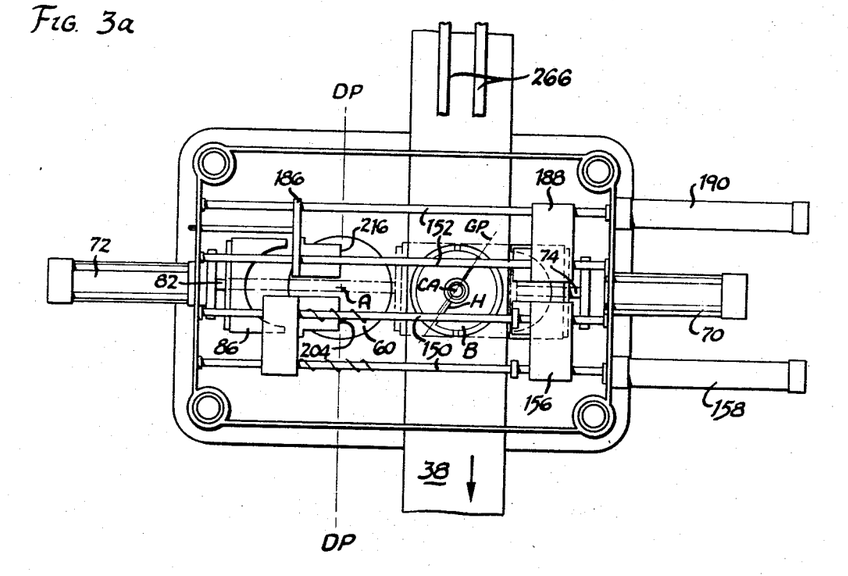
FIGURES 3a and 3b are simplified top and end views of the die knife assembly showing the positions of the parts upon the location of an article in a ready position with respect to the die-knife assembly.
Figure 3B:
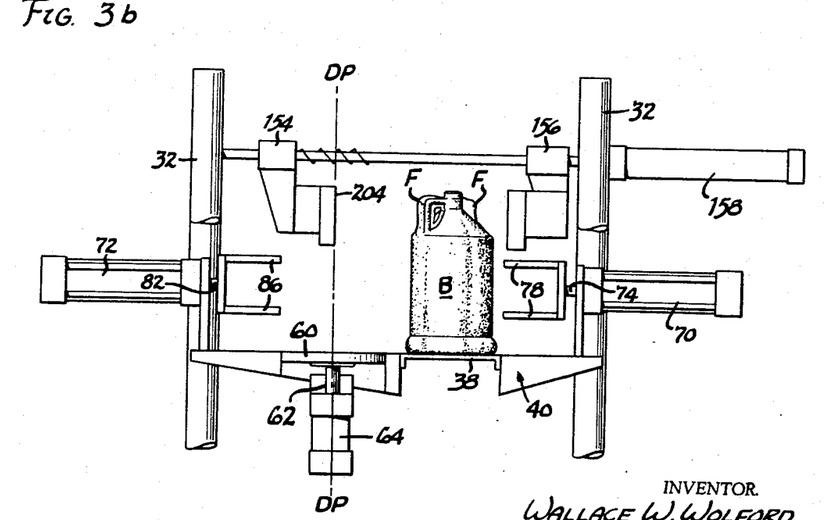
Figure 4A:
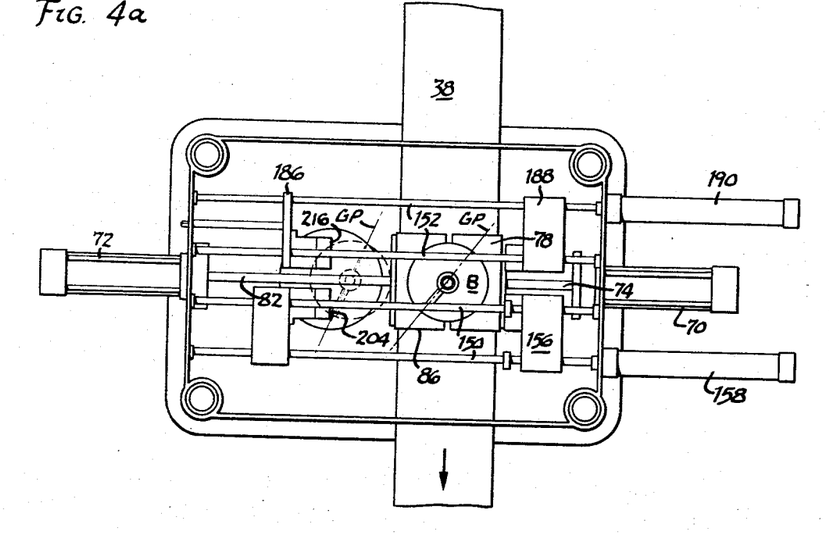
FIGURES 4a and 4b are simplified top and end views of the die-knife assembly showing the first stage of the transfer of an article from the ready position of FIGURES 3a and 3b into operative relationship with the die-knife assembly.
Figure 4B:
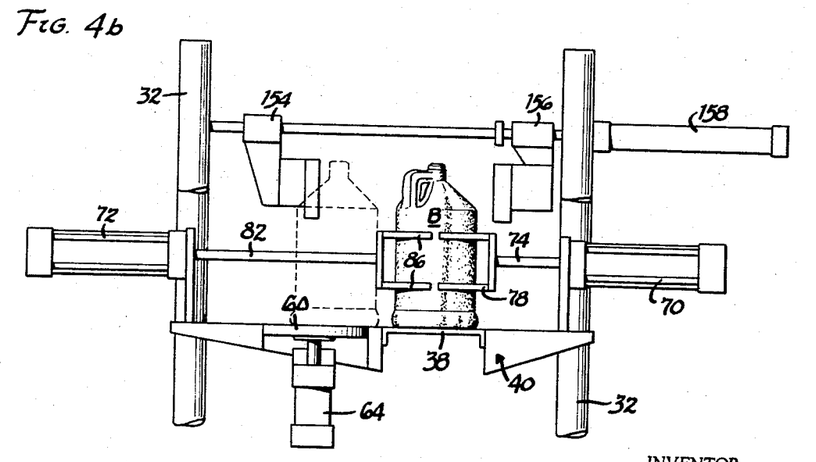
Figure 6A:
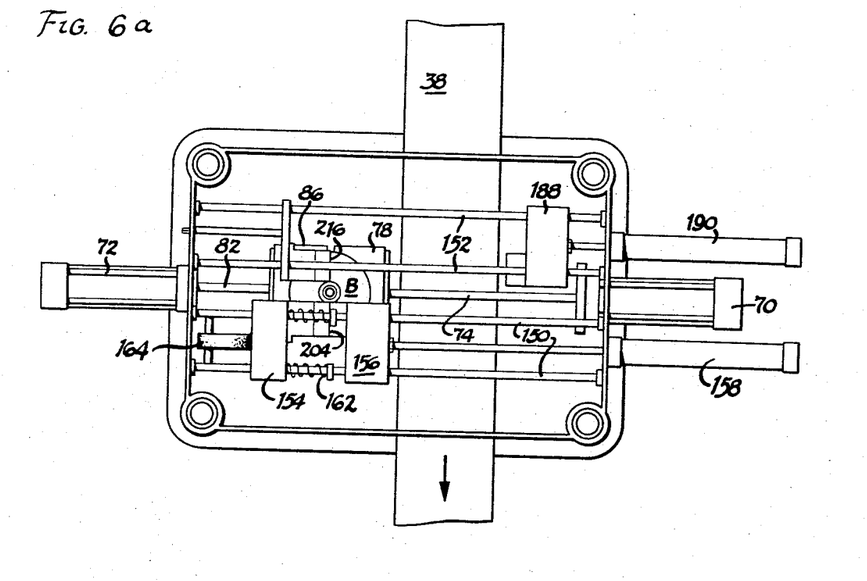
FIGURES 6a and 6b are simplified top and end elevational views showing the handle knife in mated engagement with the handle die at the moment of severing the flash from the handle portion of the bottle.
Figure 6B:
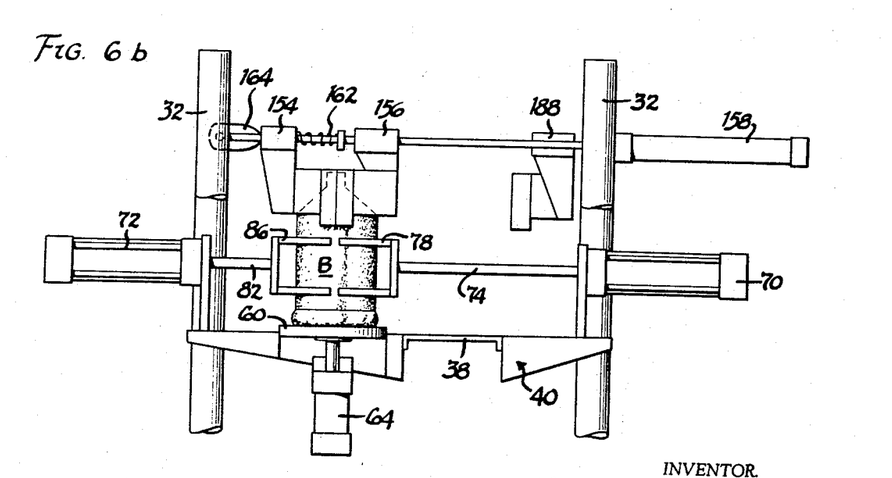
Figure 7A:
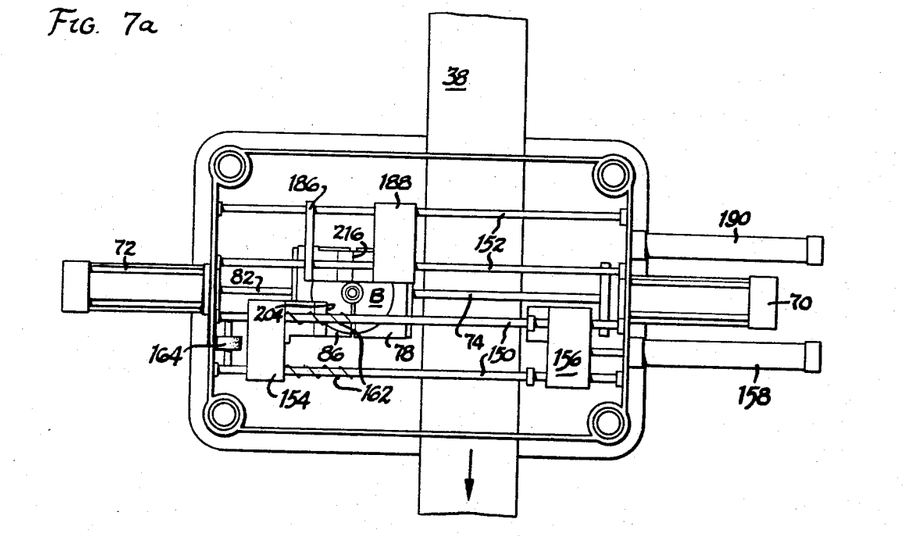
FIGURES 7a and 7b are simplified top and end elevational views of the die-knife assembly showing the positions of the parts at the moment of severing the flash from the rear shoulder portion of the article.
Figure 7B:
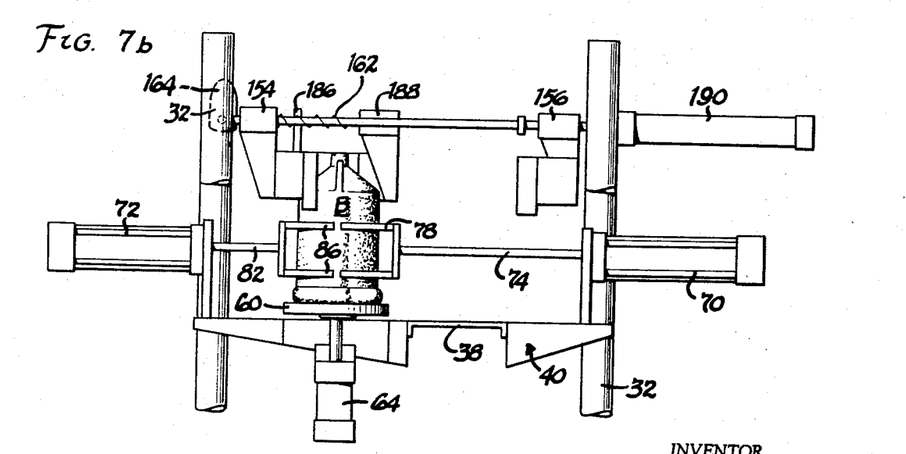

At one side of run 38 of the conveyor, a circular platform 60 is rotatably mounted upon the piston rod 62 of a pneumatic motor 64 whose cylinder is mounted upon sub-frame 40. Platform 60 is freely rotatable upon rod 62 about the axis of the rod. Motor 64 is operable to raise and lower platform 60 between its normal position flush with the surface of sub-frame 40 as shown in FIGURE 3b to intermediate or fully elevated positions shown respectively in FIGURES 6b and 7b.

Figure 5A:
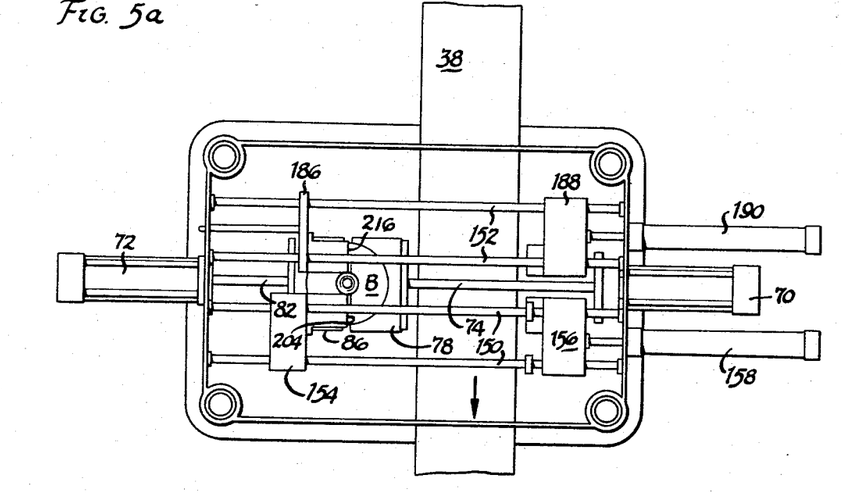
FIGURES 5a and 5b are simplified top and end elevational views of the die-knife assembly showing the bottle located in operative relationship with the handle die.
Figure 5B:
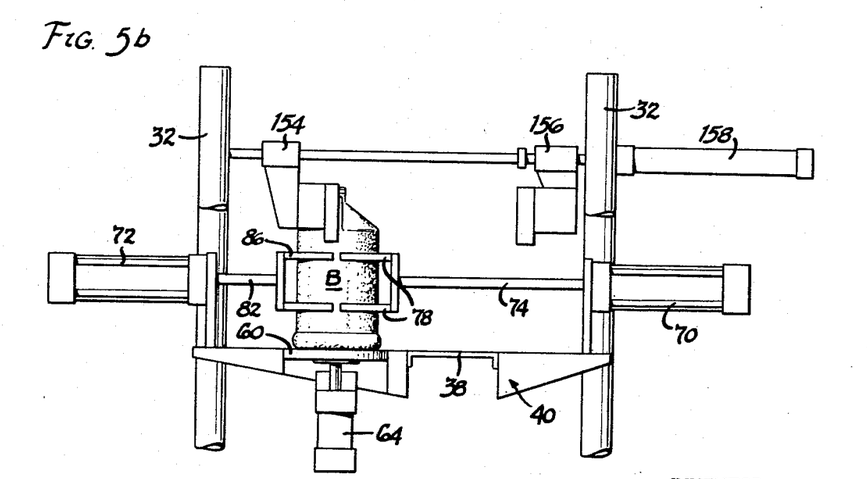

A pair of horizontally acting pneumatic transfer motors 70 and 72 are mounted upon sub-frame 40 to transfer a bottle B between run 38 of the conveyor and platform 60. Motor 70 includes a piston rod 74 having bottle engaging transfer plates 78 mounted at its outer end, these plates being conformed in shape, as best seen in FIGURES 3a and 5a to the shape of the bottle. Piston rod 82 of motor 72 likewise carries a set of transfer plates at its outer end, the plates 78 and 86 cooperating with each other to loosely grip and support the bottle B during movement between circular plate 60 and belt 38.

Also mounted upon sub-frame 40 are a pair of spaced parallel horizontally extending front support rods 150 and a similar pair of rear support rods 152. A front die carrier 154 and a front knife carrier 156 are slidably supported upon rods 150. A pneumatic motor 158 is employed to shift knife carrier 156 between the retracted position of FIGURES 3a and 3b and the actuated or cutting position of FIGURES 6a and 6b.

Die carrier 154 is normally held in the operative position of FIGURES 3b–6b by a cam 164 (shown in FIGURE 6b only) which forces die carrier 154 to the right as viewed in these figures against the action of a compression spring 162. Cam 164 can be shifted from the FIGURE 6b position to the FIGURE 7b position to permit die carrier 154 to retract to the FIGURE 7b position under the action of compression spring 162.

A rear die carrier 186 is mounted at a stationary position on rear support rods 152, while a rear knife carrier 188 is slidably supported upon rods 152 for movement upon actuation of a pneumatic motor 190.

Figure 8:
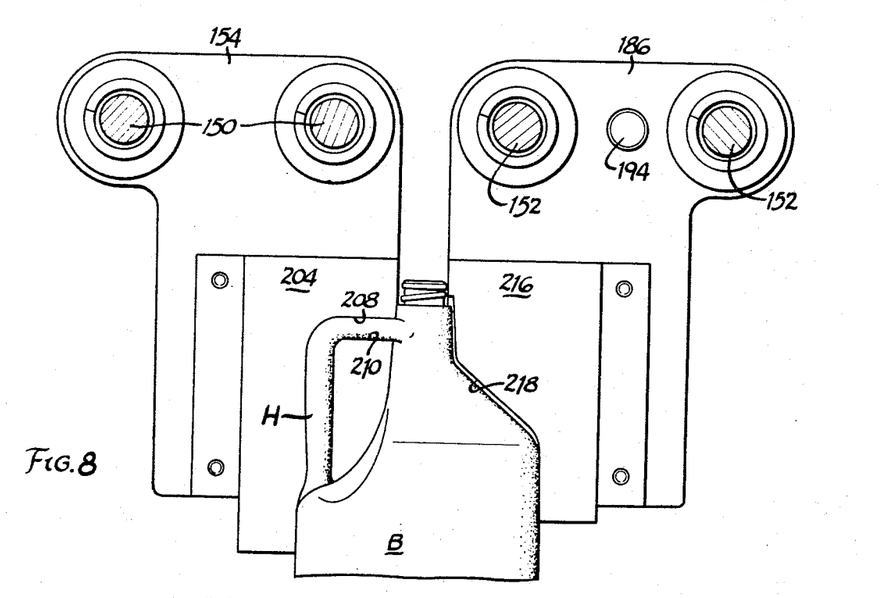
FIGURE 8 is a detail front elevational view, partially in section, of the dies, showing a bottle in operative relationship with the handle die.
Figure 9:
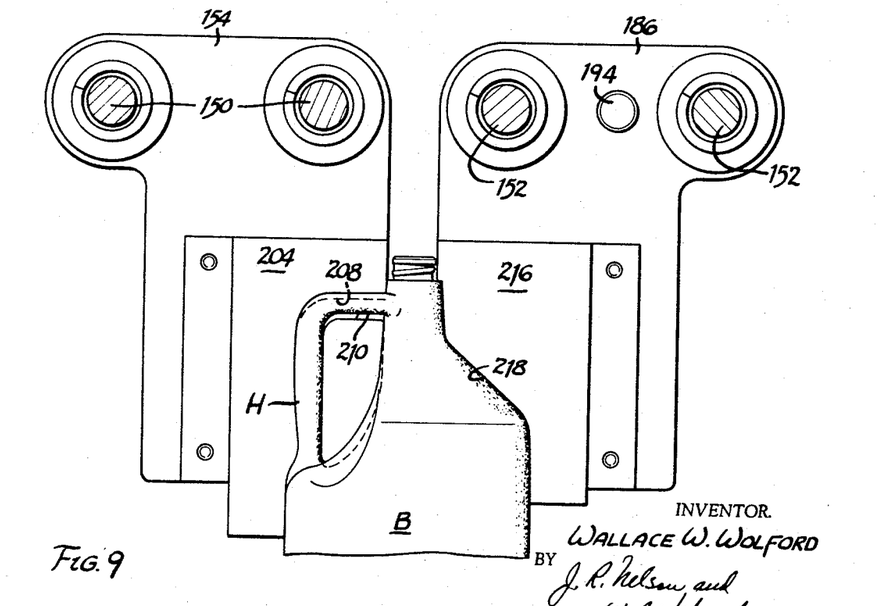
FIGURE 9 is a view similar to FIGURE 8, showing the bottle in operative relationship with the rear shoulder die.

Referring now to FIGURES 8 and 9, front die carrier 154 carries a front or handle die having a flat face 204 and formed with a recess conformed in shape to the handle of the bottle B, this recess having edges 208 and 210 at the juncture of surface 204 and the handle receiving recess. Similarly, rear die carrier 186 has a rear shoulder die mounted upon it having a flat die face 216 which terminates at a shoulder die edge 218 conformed in shape to the juncture of the rear shoulder of bottle B and any flash which may project from the bottle surface. Die faces 204 and 216 lie in a common plane when front die carrier 154 is in its normal position, and this common plane also contains the axis of rotation of circular platform 60.

The front knife carrier 156 and the rear knife carrier 188 carry respective knives, not shown, conformed in shape to edges 208, 210 and 218 so that when the knife carriers are driven into the cutting position, the knives move into shearing relationship with the respective edges 208, 210 or 218 to shear flash from the bottle.

In the particular example of container shown in the drawings, the difference in configuration between the front die and the rear die requires that the container be positively oriented with respect to the dies.

Figure 1:
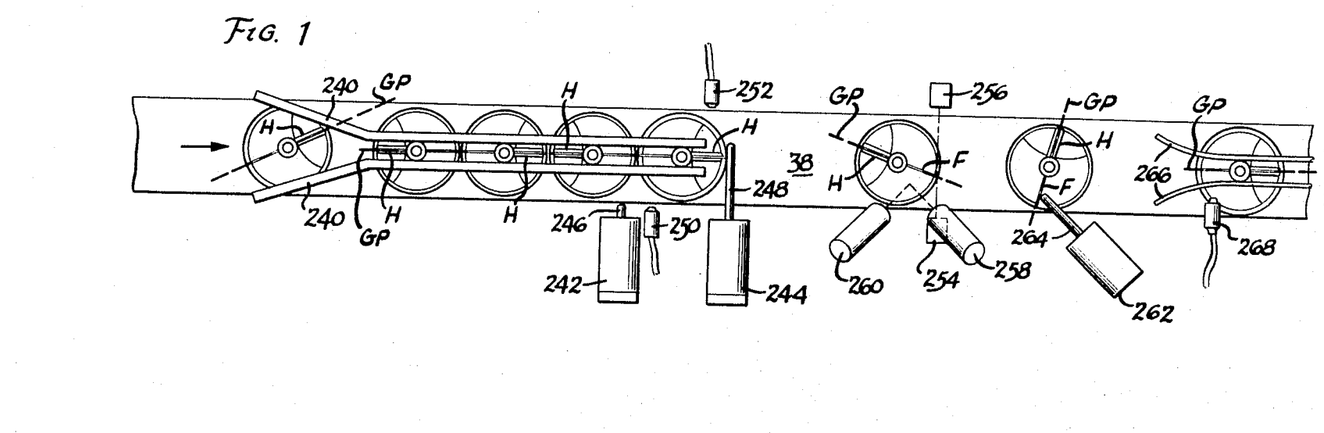
FIGURE 1 is a schematic top plan view of apparatus for performing the method of the present invention.
Figure 2:
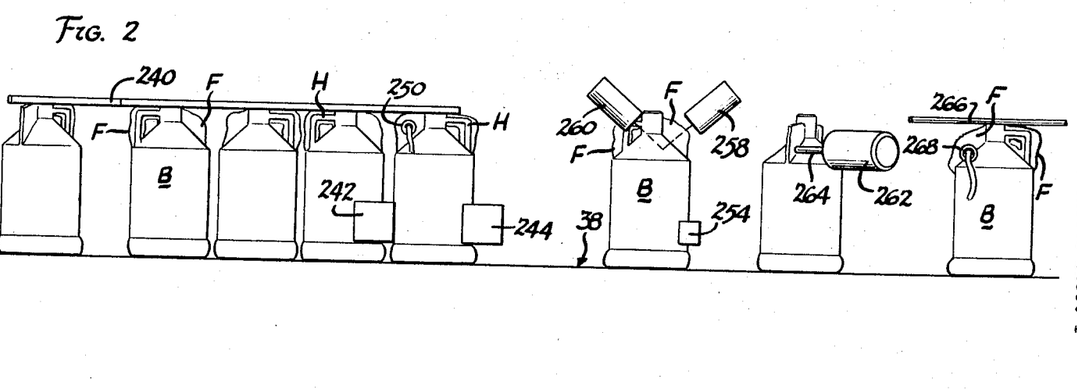
FIGURE 2 is a schematic side elevational view of the apparatus in FIGURE 1.

In FIGURES 1 and 2 there is shown one form of infeed arrangement for taking containers randomly oriented upon run 38 of the conveyor belt to assure that all containers are fed into operative relationship to the dies with the handle foremost with respect to the direction of conveyance.

In FIGURES 1 and 2, bottles B having flash F to be removed are fed in single line in random orientation along conveyor 38 from left to right as viewed in FIGURES 1 and 2. The bottles first engage a pair of neck guides 240 spaced above the surface of conveyor 38 to be engageable with the upper portions of the projecting flash F so that as the bottles pass through neck guides 240, they are oriented with the general plane GP of the flash extending parallel to the direction of movement. No effort is made at this time to make sure that the handle H of the bottle is foremost.

At the downstream end of neck guides 240, a pair of gate motors 242 and 244 are located, the motors having piston rods 246 and 248 respectively which are movable into the path of the bottles along the conveyor. The gate motors operate to release one bottle at a time from neck guides 240, piston rod 246 moving into the path of bottles upon the retraction of piston rod 248 and vice versa. Two air jets 250 and 252 are located to blow against the handle flash and shoulder flash of the bottle held by piston rod 248 so that as the bottle leaves neck guides 240, the general plane of the flash is located at an angle to the direction of movement.

As the bottle moves downstream beyond gate motor 244, it breaks the light beam between a light source 254 and a photocell 256 which forms part of a detector including a second light source 258 and photocell 260 which detect whether the bottle handle is facing in the desired forward direction or not.

As best seen in FIGURES 8 and 9, the bottle handle side of the container has a recess in the shoulder portion. Light source 258 and photocell 260 are so related to each other that if, as shown in FIGURE 1, the bottle handle is facing rearwardly, light from source 258 will be reflected from the bottle shoulder into photocell 260. When photocell 260 is exposed to light, it actuates a pneumatice turning motor 262 to extend its piston rod to engage the flash on the bottle shoulder to thereby cause the bottle to rotate as shown in FIGURE 1 to permit the handle H to move to the front as the bottle moves toward a second set of neck guides 266. If the bottle handle is facing forwardly as the bottle passes the light beam between source 254 and photocell 256, light from source 258 strikes the bottle in the handle recess and is not reflected to photocell 260 and in this case motor 262 is not actuated.

As the bottles move into neck guides 266, an air jet 268 is applied to rotate the bottle about its central axis in a clockwise direction so that the general plane of the flash is inclined forwardly and to the right as it passes beyond the last position shown in FIGURES 1 and 2.

With the bottle oriented in the foregoing manner, the flash is removed in a step-by-step operation shown in sequence in FIGURES 3a through 7b. Referring first to FIGURES 3a and 3b, the bottle, still guided by neck guides 266, moves along the upper run 38 of the conveyor belt until the bottle is located in position between transfer motors 70 and 72 as shown in FIGURE 3a. At this time, the general plane of the flash GP is inclined as shown in FIGURE 3a. The transfer motors are then actuated to grip the bottle B loosely as shown in FIGURES 4a and 4b and the motors are then actuated to shift the bottle to the left until its central axis becomes coincident with the axis of rotation of circular platform 60.

During this movement, as the bottle B is moved by transfer motors 70 and 72 toward the dies, the first portion of the bottle to engage the die faces is the handle H or the flash projecting outwardly from the handle. This region of the bottle engages the flat die face 204 of the handle die because of the fact that the general plane of the flash was inclined by air jet 268 to the position shown in FIGURE 3a. As the bottle moves to the left, this engagement of the flash causes the bottle to rotate about its axis to swing the general plane GP of the flash on the bottle toward coincidence with the common plane DP of the flat die faces. Rotation of the bottle in this manner is permitted by the freely rotatable support of circular platform 60 upon its piston rod.

During the movement of the bottle toward the die face, very light pressure has been applied to motor 64 to extend its piston rod to elevate the bottle B slowly as the general plane of the flash GP of the bottle is being rotated into coincidence with the plane DP of the die faces. The handle of the bottle B is thus swung into the handle recess by a combination of movements in three directions. The first of these is the horizontal right-to-left movement under the control of transfer motor 70 and 72; the second movement is that of straight vertical movement by virtue of the actuation of motor 64, while the third movement is one of rotation about a vertical axis. This combination of movements seats the handle H of bottle B in the die recess between edges 208 and 210. The depth to which the handle projects into the recess is determined by the engagement of the projecting flash with the flat surface 204 of the handle die.

The final position of the bottle B relative to the handle die is thus determined by the engagement of edges 208 and 210 with the bottle handle surface precisely at the line of juncture between the bottle surface and the projecting flash, the flash lying in face-to-face engagement with the flat front surface 204 of the handle die. From FIGURE 8, it will be noted that at this time the bottle is spaced somewhat below edge 218 of the rear die.

With the handle seated in the handle die by the foregoing steps, the front knife motor 158 is actuated and the front knife moves into operative engagement with die edges 208 and 210, thereby shearing the flash from the bottle precisely along its line of juncture, since the bottle was self oriented with respect to the die. After the handle flash has sheared, the knife motor is retracted and the cam 164 is actuated to permit front die carrier 154 to move clear of the bottle between the FIGURES 6a and 7a positions.

Upon retraction of front die carrier 154 from engagement with the bottle, the relatively light pressure which has still been maintained in motor 64 causes the bottle to elevate until its front shoulder is in engagement with edge 218 of the rear die. Rear knife motor 190 is then actuated to shear the flash from the bottle shoulder along the line of juncture.

It will be noted that in the performance of the method above, the bottle is oriented and located with respect to the die of the die knife combination by engaging the line of juncture of the flash with the bottle surface with the corresponding edge portion of the die. By so locating the bottle with respect to the die, actuation of the knife is such that the knife must shear the flash from the bottle precisely along the line of juncture. In essence, the article is located relative to the die knife combination by the surface of the article to be cut. In this case, this surface is determined by the line of juncture of the flash with the article surface which forms a concave angular juncture of two surfaces which are subsequently moved into congruency with the convex angular juncture of surfaces defined by the flat die face and article receiving recess in the die face.

Each separate flash fin is separately cut to avoid errors induced by non-uniformity between individual articles.

In all cases, the article is aligned with the cutting mechanism by seating the line of juncture of the particular individual flash fin and the article surface in engagement with an edge of the die knife combination.

While I have described one detail embodiment of my invention, it will be apparent to those skilled in the art that the above-described embodiment may be modified. Therefore, the foregoing description is to be considered exemplary rather than limiting, and the true scope of the invention is that defined in the following claims.

I claim:

1. In a method of removing flash from a molded article by means of a die-knife combination having mating edges conformed to the line of juncture of the flash with the article surface; positioning the article in operative relationship with the die by the steps of engaging the flash on the article with the die with the line of juncture on the article spaced outwardly from the die edge, and subsequently shifting the article while maintaining the flash in engagement with the die in a direction moving the line of juncture on the article toward congruence with the die edge until the die edge engages the article surface in adjacent congruent relationship to the line of juncture.

2. In a method of removing flash from a molded article by means of a die-knife combination having mating edges conformed to the line of juncture of the flash with the article surface; positioning the article in operative relationship with the die by the steps of locating said article with flash thereon in a pre-determined spaced relationship with the die with the line of juncture on the article angularly and laterally offset relative to the die edge, moving the article toward the die to engage the flash on the article with the die with the line of juncture on the article angularly offset and spaced outwardly from the die edge, and subsequently laterally shifting and rotating the article while maintaining the flash in engagement with the die in directions moving the line of juncture on the article toward congruence with the die edge until the die edge engages the article surface in adjacent congruent relationship to the line of juncture.

3. In a method of removing flash from a molded article by means of a die-knife combination having mating edges conformed to the line of juncture of the flash with the article surface wherein the flash projects from the line of juncture in a general plane at one side of an axis of the article lying in said general plane and said die is provided with an edge lying in a first plane containing an imaginary reference line related to the die edge in the same relationship as that between said axis and line of juncture; positioning the article in operative relationship with the die by the steps of locating said article with flash thereon in spaced relationship to said die with said axis and said reference line in planar alignment with each other, moving the article toward said die while maintaining said planar alignment to engage the flash on the article with the die with the line of juncture on the article spaced outwardly from the die edge, and subsequently shifting the article in a direction moving the line of juncure on the article toward congruence with the die edge while maintaining the flash in engagement with the die and the planar alignment between said axis and said reference line until the die edge engages the article surface in adjacent congruent relationship to the line of juncture and said axis and said reference line are in substantial coincidence with each other.

4. In a method of removing flash from a molded article by means of a die-knife combination having mating edges conformed to the line of juncture of the flash with the article surface wherein the flash projects from the line of juncture in a general plane at one side of an axis of the article lying in said general plane and said die is provided with an edge lying in a first plane containing an imaginary reference line related to the die edge in the same relationship as that between said axis and said line of juncture; positioning said article in operative relationship with the die by the steps of locating said article with flash thereon in spaced relationship to said die with said axis and reference line in planar alignment with each other and with the line of juncture on the article angularly and laterally offset relative to the die edge to engage the flash on the article with the die with the line of juncture on the article spaced outwardly from the die edge, and subsequently laterally shifting and rotating the article about said axis in a direction moving the line of juncture on the article toward congruence with the die edge while maintaining the flash in engagement with the die and the planar alignment between said axis and said reference line until the die edge engages the article surface in adjacent congruent relationship to the line of juncture and said axis and said reference line are in substantial coincidence with each other.

5. The method of removing flash from the shoulder portions of a molded bottle or similar article wherein the flash projects in a general plane from a line of juncture with the article surface comprising the steps of locating a die having an edge lying in a general plane and conformed to said line of juncture in a predetermined position with said edge disposed in a vertical plane, locating the article having flash thereon in spaced relationship to said die with the flash to be removed from said article disposed in a vertical plane and the line of juncture of the flash with the surface of said article horizontally and vertically offset from said die edge, advancing said article horizontally toward said die to engage the flash on the article with said die while simultaneously shifting the article vertically until the line of juncture on the article is located adjacent congruent relationship with the die edge, and subsequently advancing a knife having an edge conformed to mate with said die edge into mating engagement with said die edge to sever the flash from the article along the line of juncture.

6. The method of removing flash from the shoulder portions of a molded bottle or similar article wherein the flash projects in a general vertical plane from a line of juncture with the article surface having a known relationship to a vertical axis of the article, comprising the steps of locating a die having an edge lying in a general plane and conformed to the line of juncture in a predetermined position with said edge disposed in a first vertical plane and having the same relationship to an imaginary vertical reference line in said first vertical plane as that of said line of juncture to the vertical axis of the article, locating the article in spaced relationship to said die with the article axis and reference line lying in a second vertical plane and the line of juncture of the flash with the surface of said article horizontally and vertically offset below from said die edge, advancing said article horizontally toward said die in a direction maintaining said article axis in said second plane while simultaneously elevating the article to move the line of juncture on the article into adjacent congruent relationship with the die edge, and advancing a knife having an edge conformed to mate with said die edge into mating engagement with said die edge to sever the flash from the article along the line of juncture.

7. The method of removing flash from the shoulder portions of a molded bottle or similar article wherein the flash projects in a general vertical plane from a line of juncture wtih the article surface having a known relationship to a vertical axis of the article comprising the steps of locating a die having an edge lying in a general plane and conformed to the line of juncture in a predetermined position with said edge disposed in a first vertical plane and having the same relationship to an imaginary vertical reference line in said first vertical plane as that of said line of juncture to the vertical axis of the article, locating the article in a ready position in spaced relationship to said die with the flash to be removed from said article disposed in a vertical plane inclined toward said first plane and the line of juncture of the flash with the surface of said article horizontally and vertically offset from said die edge, advancing said article from said ready position horizontally towards said die along a path wherein said axis is moved in a straight line toward said reference line to engage the flash on the article with said die while simultaneously rotating the article about its axis and elevating the article to move the line of juncture on the article into adjacent congruent relationship with the die edge with the general plane of the flash in adjacent parallelism with said first plane, and advancing a knife having an edge conformed to mate with said die edge into mating engagement with said die edge to sever the flash from the article along the line of juncture.

8. The method of removing flash from the shoulder portions of a molded bottle or similar article wherein the flash projects in a general vertical plane from a line of juncture with the article surface having a known relationship to a vertical axis of the article, comprising the steps of locating a die having an edge lying in a general plane and conformed to the line of juncture in a predetermined position with said edge disposed in a first vertical plane, and having the same relationship to an imaginary vertical reference line in said first vertical plane as that of said line of juncture to the vertical axis of the article, conveying the article to a ready position wherein said article is in spaced relationship to said die with the line of juncture of the flash with the surface of said article horizontally and vertically offset from said die edge, orienting the article during its movement to said ready position to incline the plane of the flash toward said first plane, advancing said article from said ready position horizontally towards said die along a path wherein said axis is moved in a straight line toward said reference line to engage the flash on the article with said die while simultaneously rotating the article about its axis and elevating the article to move the line of juncture on the article into adjacent congruent relationship with the die edge with the general plane of the flash in adjacent parallelism with said first plane, and advancing a knife having an edge conformed to mate with said die edge into mating engagement with said die edge to sever the flash from the article along the line of juncture.

9. The method of removing flash from the shoulder portions of a molded bottle wherein the flash projects from the bottle in a vertical general plane to the front and to the rear of the vertical axis of the bottle and wherein the flash is joined to the bottle surface at front and rear lines of juncture, comprising the steps of locating front and rear dies having die edges respectively conformed to the front and rear line of juncture in a first position wherein the die edges lie in a common first vertical plane containing an imaginary vertical reference line from which the front and rear die edges are horizontally spaced in the same relationship as the front and rear lines of juncture are horizontally spaced from the bottle axis and with the rear die edge elevated relative to the front die edge as compared to the vertical relationship between the front and rear lines of juncture, locating the bottle in a ready position horizontally spaced from said dies with the front lines of juncture on the bottle vertically offset below the front die edge, advancing the bottle from said ready position in a direction moving the bottle axis toward said reference line while simultaneously elevating the bottle until the front line of juncture is disposed in adjacent congruent relationship with the front die edge, advancing a front knife having an edge adapted to mate with said front die edge into mating engagement therewith to sever the flash from the bottle along the front lines of juncture, retracting said front knife and said front die clear of the bottle, elevating the bottle until the rear line of juncture is disposed in adjacent congruent relationship with the rear die edge, and advancing a rear knife having an edge adapted to mate with said rear die edge into mating engagement therewith to sever the flash from the bottle along the rear line of juncture.

References Cited by the Examiner
UNITED STATES PATENTS

| | | |
|---|---|---|
| 2,392,459 | 1/1946 | Casalino. |
| 2,743,478 | 5/1956 | Harlow et al. |
| 3,145,243 | 8/1964 | Hagen ___________ 264—161 |

ROBERT F. WHITE, *Primary Examiner.*

S. HELLER, S. I. LANDSMAN, *Assistant Examiners.*